Patented Mar. 27, 1945

2,372,370

UNITED STATES PATENT OFFICE 2,372,370

PRINTING COMPOSITION

Jacques Duport, Basel, Switzerland, assignor to Durand & Huguenin S. A., Basel, Switzerland, a firm No Drawing. Application April 21, 1942, Serial No. 439,916. In Germany August 31, 1939

11 Claims. (Cl. 8—70)

This application is a continuation-in-part of my U. S. patent application Ser. No. 363,235 filed on October 28, 1940, and issued on Nov. 24, 1942 as Patent No. 2,302,753.

This invention relates to a process for printing textile fibres with ester salts of leuco vat dyestuffs and to dyestuff compositions, especially adapted for that purpose. More particularly it relates to the preparation of printing compositions containing ester salts of leuco vat dyestuffs and bodies, which have a dissolving, i. e. a dispersing action on the ester salts. Still more particularly it relates to printing compositions, containing as bodies having a dissolving i. e. a dispersing action on the ester salts, salts of an organic acid, free from carboxylic acid ester groups with primary to tertiary nitrogenous organic bases, containing as solubilizing group at least one hydroxy-alkyl group. Still more particularly it relates to printing compositions, especially adapted for the application of difficultly soluble to insoluble ester salts, especially to difficultly soluble to insoluble alkali ester salts of leuco vat dyestuffs.

The ester salts of leuco vat dyestuffs present in the printing composition may base on dyestuffs and on dyestuff intermediate products. Ester salts deriving from the various series of vat dyestuffs (indigoids, thioindigoids and all vat dyestuffs, containing the anthraquinone nucleus system) are of particular value, whereby the ester salts also may base on the various reduction products from one and the same dyestuff. The invention in particular includes the application of sulfuric acid esters derived from enolic compounds yielding by acid oxidation the corresponding vat dyestuff. Preparations of special interest and value are obtained, when using alkali salts of acid sulfuric acid esters of leuco vat dyestuffs, being easily obtainable according to known methods in stable powder form.

By a treatment with oxidizing agents and acid the water-soluble ester salts of leuco vat dyestuffs are converted into the corresponding water-insoluble vat dyestuffs. In particular, by treating salts of acid sulfuric acid esters of leuco vat dyestuffs with oxidizing agents in acid medium, the corresponding vat dyestuffs are recovered.

The printing of textile materials with salts of acid sulfuric acid esters of leuco vat dyestuffs, known in the trade as "Indigosols," "Algosols," "Soledons" and so on is a known art. It generally comprises dissolving the ester salt in water and a thickening agent, bringing the printing paste thus obtained on to the fabric by means of known printing methods and developing the insoluble vat dyestuff by acid oxidation. This oxidizing process can be performed in a simple manner in a bath, containing acid and an oxidizing agent, reacting in an acid medium. For a number of purposes it is preferable to add the oxidizing agent to the printing paste. In this case oxidation is effected by simply treating the printed textile materials in an acid bath. In practice, sodium nitrite and sodium chromate have proved to be suitable oxidizing agents. In order to prevent the printing colors from getting acid and to prevent therefore a premature oxidation of the ester salts, some sodium carbonate is generally added. In many cases, it is advantageous to subject the printed material, before the acid treatment, to a steaming operation. In certain cases, it is undesired to treat the printed material in an acid bath. In such cases the oxidation can be effected by steaming in neutral steam, provided that the printing paste contains besides the oxidizing agent a substance yielding acid when steaming.

This process is very important, when using ester salt of leuco vat dyestuffs besides other dyestuffs, developable by a steaming process. For the steam developing method sodium chlorate or ammonium chlorate have been found to be suitable oxidizing agents. Substances yielding acid during steaming are for instance ammonium salts, such as ammonium sulfate, ammonium oxalate and particularly ammonium thiocyanate. In order to accelerate the oxidation, as a rule there is added a catalyst, such as for instance ammonium vanadate, to the printing colors which are to be developed by steam. Besides this printing i. e. developing in neutral steam, there exist in practice other methods, whereby the ester salts are oxidized by a drying or hanging operation, and aluminium chlorate for instance may be used as oxidizing agent.

In order to obtain with ester salts even prints with good penetration into the fibre materials, showing a possibly high dyeing power and brilliancy, it is necessary, that in the prepared printing colors the leuco ester salts are present in form of a suitable dispersion. Quite generally first the leuco ester salt must be dissolved in the printing paste. In order to obtain deep shades, a quantity of ester salt, corresponding to 2-3 parts of vat dyestuff of 100% strength per 100 parts of printing color, must be dissolved. A number of ester salts dissolve in these concentrations—eventually in the presence of a commonly used solvent—only in the warmth, but remain dissolved, when cooling the solution again.

Many other leuco ester salts, amongst them some of the most valuable ones of beautiful shades and excellent fastness of the prints, do not show this relatively good solubility. Some of them dissolve in the warmth, but partly precipitate again on cooling, also in the presence of a solvent. Still other ester salts dissolve also in the warmth only to a small extent. When cooling the printing colors, the dissolved portion precipitates again partly or completely. Another difficulty may also arise with cold printing colors, containing the ester salt in solution, when adding to such a color the oxidizing agent i. e. the acid yielding substance, required for the development. In some cases suddenly, in others on standing, the ester salt precipitates, whereby often large crystals of the leuco ester salt are formed. This is explainable by the fact, that leuco ester salts are salts of a strong acid and a strong base, being highly dissociated in aqueous solution. Hence they are sensitive against other electrolytes and can, therefore, be salted out. In most of the cases a printing color containing the ester salt in a precipitated state becomes useless for printing purposes, because such a color blocks the engraving of the printing roller or because it contains the ester salt in form of differently sized particles or in form of large crystals, thus preventing the production of even prints.

Prior publications disclose, that in view of the above cited difficulties, attempts have already been made for improving the solubility of ester salts of leuco vat dyestuffs.

It has been found, that compared with the usually employed sodium salts of the leuco esters, the lithium salts (see British Patent 401,137), the alkylolamine salts (see U. S. Patent 1,954,702) and the salts with bases, obtainable by the reaction of at least one molecular proportion of an alkylene oxide with triethanolamine (see U. S. Patent 2,159,195) show a better solubility. All these salts show one common disadvantage in as much as on adding the usual oxidizing agents i. e. acid yielding substances (such as sodium nitrite, sodium chlorate, ammonium thiocyanate) to the printing pastes, the more difficultly soluble sodium or ammonium salts are precipitated again.

In the U. S. Patent 1,954,702 there is further proposed to add a free alkylolamine base to printing pastes, containing leuco ester salts in their commercial form (usually the sodium salts). The application of an excess of such a free base is unpractical for all methods, according to which an oxidizing agent and an acid yielding substance are added to the printing color. A correct dosage of these ingredients (especially of the acid yielding substance) for the development by steaming or hanging, is rendered difficult or even impossible in the presence of the excess of the free base.

In the U. S. Patent 2,205,032 there is proposed to add to printing pastes, containing leuco ester salts, salts of mono esters of aromatic dicarboxylic acids, in particular salts of monoesters of phthalic acid. There are proposed salts of these ester acids with alkalis, as well as with organic bases. These latter bases may be for instance cyclohexylamine or alkylolamines. The preparation of these monoester acids, however, is complicated and expensive. For this reason they appear not adapted for practical use.

It is now an object of this invention to provide improved printing compositions, containing the ester salts of leuco vat dyestuffs in an optimal degree of dispersion suitable for printing. It is a further object to provide printing compositions containing the difficultly soluble to insoluble ester salts of leuco vat dyestuffs in an optimal degree of dispersion suitable for printing. It is still a further object to provide printing compositions, containing the leuco ester salts precipitated in a most finely divided form, whereby the precipitated ester salts are present in form of particles as nearly as possible of the same size.

It is still a further object of the invention to provide printing compositions, containing the leuco ester salts dissolved in the printing color. A still further object of the invention is to provide printing compositions, containing the ester salts of leuco vat dyestuffs, besides a suitable oxidizing agent and optionally besides an acid yielding substance in an optimal degree of dispersion suitable for printing. A still further object is to provide prints on fabrics, distinguished by their evenness, their brilliancy of the shade and by a maximum of dyeing power.

These and other objects are accomplished by incorporating into a leuco ester salt composition a salt of an organic acid, free from carboxylic acid ester groups, with primary to tertiary nitrogenous organic bases, containing as solubilizing group at least one hydroxy alkyl group.

The following organic acids have proved suitable for the formation of salts with bases of the above described type: The low and higher molecular aliphatic carboxylic acids, in particular hydroxy- and dicarboxylic acids, such as for instance lactic, tartaric, oxalic, succinic acid and the like, aromatic acids, such as benzoic, hydroxybenzoic, phthalic acid, heterocyclic acids, such as for instance pyromucic acid, sulfonic acids, such as for instance ricinol sulfonic, para-toluene sulfonic, dimethyl-aniline sulfonic, naphthalene sulfonic, alkyl naphthalene sulfonic, sulfobenzoic acid and the like.

The primary to tertiary nitrogenous organic bases used in form of their salts with organic acids of the above defined species, for the preparation of the dyestuff compositions and containing as a water solubilizing group at least one hydroxy alkyl group may contain aliphatic, aromatic, hydroaromatic and mixed aliphatic-aromatic radicals.

The nitrogen may form part of a heterocyclic ring, containing besides the nitrogen atom other hetero atoms. Every one of the above cited radicals again, may be composed of different organic radicals, which may be linked together for instance by O, S, NH, NHCO, NH—SO₂, or other linking members. Especially good results are obtained with organic nitrogenous bases, containing aliphatic radicals linked together ethereal by oxygen bridges, such as they are obtained easily by the reaction of alkylene oxides with suitable bases containing hydroxy groups. The nitrogenous organic bases may be mono-, di- or polyamines. Polyvalent bases may contain side by side nitrogen atoms of the various alkylation or arylation stages.

The new dyestuff preparations may also be made up with mixtures of salts of various bases with organic acids of the above defined species, that is to say, with mixtures of salts of one base with various organic acids or with mixtures of various bases with various organic acids.

For the preparation of the new printing compositions the following organic nitrogenous bases, containing at least one hydroxy alkyl group in form of their salts with organic acids of the above disclosed type have been found suitable:

Alkylolamines, respectively mixtures of the mono-, di- and trialkylolamines, alkylolalkylene- di- and polyamines—(in general the reaction- products of halogen hydrines or alkylene oxides on ammonia, amines, hydroxyamines and poly- alkylene-polyamines, in so far as primary to ter- tiary amines are formed by such a process)— polyhydroxyamines, such as glucamine, digluc- amine, further aromatic alkylolamines, hydroxy- alkylol compounds of the heterocyclic series, not containing quaternary nitrogen atoms, such as N-hydroxyethylpiperidine or N-hydroxyethyl- morpholine. Particularly suitable are nitrogen- ous organic bases, containing besides hydroxy groups one or more ethereal radicals, such as for instance the hydroxyethylethers of triethanol- amine, of diethylaminoethanol, of tetraethanol- ethylendiamine, of asymmetric diethyldiethanol- ethylendiamine, of dihydroxyethylaniline, of N- hydroxyethylpiperidine and of N-hydroxyethyl- morpholine. Excellent results are obtained with salts of bases, containing for each alkyl radical linked with nitrogen more than one etherbond.

According to the present invention, the dye- stuff compositions can quite generally be pre- pared by mixing an enol ester compound with an organic nitrogenous compound of the above de- fined type, optionally in the presence of a suit- able liquid diluting agent. A simple and prac- tical form of preparation consists in mixing a salt of an enol ester compound with a salt of the base with an organic acid of the above de- scribed type, in substance or in the presence of water.

In the new dyestuff preparations the above described salts act as dispersing agents in the presence of a suitable solvent. The degree of dispersion which may be attained depends on the properties of the enol ester compound, especially on its solubility, on the nature and of the quan- tity of the applied salt and also on the presence of other ingredients. The degree of dispersion may vary from the molecular dispersion phase to a complete precipitation of the enol ester com- pound in finely divided form.

By suitably selecting the salts of the organic nitrogenous bases and proper dosage of the amount to be added to the dyestuff preparation, the degree of dispersion of the various enol ester compounds can be adjusted in such a way, that for one and the same ester compound and for the selected application i. e. developing method the highest degree of dispersion, yielding in print- ing on textile material a maximum yield in dyeing power, is obtained. The new preparations repre- sent a valuable improvement in printing with enol ester compounds.

Especially the difficultly soluble, hitherto not or only difficultly applicable alkali ester salts of cer- tain enol ester compounds may now in form of the new preparation advantageously be used for printing.

The present invention will be further de- scribed in connection with the following specific examples, in which the parts are by weight and which are given in order to illustrate this inven- tion. It will be realized, however, that the pres- ent invention is not limited thereto, but that changes may be made in the dyestuffs and in- gredients and their proportions, manipulation steps and other conditions without departing from the scope of the appended claims.

*Example 1*

The following printing preparation is made up:
40 parts of the sodium salt of the acid sulfuric acid ester of leuco-2:1-6:5-anthraquinone-di- phenylthiazol, corresponding to 50% of vat dye- stuff are dissolved in the heat with 320 parts of water, 80 parts of the formiate of the trihydroxy- ethylether of triethanolamine and 500 parts of a neutral starch tragacanth thickening. The solu- tion is cooled down. To the cold solution there are added, whilst stirring, 40 parts of a solution of sodium nitrite (30%) and 20 parts of a solu- tion of sodium carbonate (10%). The prepara- tion thus obtained contains the ester salt precipi- tated in a finely divided form.

When cotton is printed with this preparation and the print steamed for 4 minutes in a Mather- Platt apparatus and afterwards developed during 8 seconds at 70° C. in an acid bath, containing 20 ccm. of conc. sulfuric acid per liter, there is obtained, after the usual washing and soaping at the boil, an even and deep canary-yellow print.

In the above example the formiate of the tri- hydroxyethylether of triethanolamine may be replaced by the following salts yielding substan- tially equivalent results: acetate, lactate, ox- alate, tartrate of the trihydroxyethylether of tri- ethanolamine, lactate of the tetrahydroxy-poly- ethylether of the tetraethanol-ehylene-diamine (obtainable from tetraethanolethylenediamine and 8 molecules of ethylene oxide).

*Example 2*

The following printing preparation is made up:
40 parts of the sodium salt of the acid sulfuric acid ester of leuco-2:1-6:5-anthraquinone-di- phenylthiazol, corresponding to 50% of vat dye- stuff are dissolved by warming with 280 parts of water, 80 parts of the acetate of the trihydroxy- ethylether of triethanolamine and 500 parts of a neutral starch tragacanth thickening. The solu- tion is cooled down. To the cold solution there are added under stirring 40 parts of a solution of ammonium thiocyanate (50%), 50 parts of a solution of sodium chlorate (25%) and 10 parts of a solution of ammonium vanadate (1%), whereby the ester salt precipitates in a finely divided form.

When cotton is printed with this preparation and the print steamed for 8 minutes in a Mather- Platt apparatus, there is obtained, after the usual washing and soaping at the boil, a deep and vivid canary-yellow print.

*Example 3*

The following printing paste is made up:
40 parts of the sodium salt of the acid sulfuric acid ester of leuco-dibromoanthanthrone, cor- responding to 50% of vat dyestuff are dissolved in the heat with 300 parts of water, 100 parts of the formiate of the trihydroxyethylether of tri- ethanolamine and 500 parts of a neutral starch tragacanth thickening. The solution is cooled down and to the cold solution 30 parts of a solu- tion of sodium nitrite (30%) and 20% of a solu- tion of sodium carbonate (10%) are added, while stirring.

When cotton is printed with this preparation and afterwards developed during 8 seconds at 70° C. in an acid bath containing 20 ccm. of conc. sulfuric acid per liter, there is obtained after the usual washing and soaping at the boil, an even deep and vivid red-orange colored print.

In the above example the formiate of the trihydroxyethylether of triethanolamine may be replaced by the following salts with substantially equivalent result: acetate, lactate, oxalate, tartrate of the trihydroxyethylether of triethanolamine, lactate of the mixture of the hydroxyethers of the diethylaminoethanol (obtainable for example from diethylaminoethanol and four molecules of ethylene oxide in methanol solution).

Example 4

The following printing preparation is made up:
40 parts of the sodium salt of the acid sulfuric acid ester of leuco-2:1-naphthioindigo corresponding to 50% of vat dyestuff are dissolved by heating up with 380 parts of water, 50 parts of the lactate of the trihydroxyethylether of triethanolamine and 500 parts of a neutral starch tragacanth thickening. The solution is cooled down. Then 30 parts of a solution of sodium nitrite (30%) are added whilst stirring. A preparation, containing the ester salt precipitates in a fine dispersion, is obtained.

When cotton is printed with this preparation and the print developed, as indicated in Example 1, there is obtained an even, deep brown print.

Example 5

The following printing preparation is made up:
40 parts of the sodium salt of the acid sulfuric acid ester of leuco-2:1-naphthioindigo, corresponding to 50% of vat dyestuff are dissolved in the heat with 320 parts of water, 50 parts of lactate of the trihydroxyethylether of triethanolamine and 500 parts of a neutral starch tragacanth thickening. The solution is cooled down whilst stirring. To the cold solution there are added, whilst stirring, 30 parts of a solution of ammonium thiocyanate (50%), 40 parts of a solution of sodium chlorate (25%), 10 parts of a solution of ammonium vanadate (1%) and 10 parts of ammonia (25%).

When cotton is printed with this preparation and the print developed, as indicated in Example 2, there is obtained an even, deep brown print.

In the above example the 50 parts of the lactate of the trihydroxyethylether of the triethanolamine may be replaced with substantially equivalent results by 80 parts of the monochloroacetate of the triethanolamine and the 320 parts of water by 290 parts of water.

Example 6

The following printing preparation is made up:
40 parts of the sodium salt of the acid sulfuric acid ester of leuco-2:1-6:5-anthraquinone-diphenylthiazol, corresponding to 50% of vat dyestuff are dissolved by heating with 260 parts of water, 100 parts of the lactate of the trihydroxypolyethylether of the triethanolamine (obtained by the reaction of 18 molecules ethylene oxide on triethanolamine in aqueous solution) and 500 parts of a neutral starch tragacanth thickening. The solution is cooled down. Then there are added, whilst stirring, 40 parts of a solution of ammonium thiocyanate (50%), 50 parts of a solution of sodium chlorate (25%) and 10 parts of a solution of ammonium vanadate (1%). A preparation containing the ester salt in finely divided form is obtained.

When cotton is printed with this preparation and the print developed, as indicated in Example 2, there is obtained a deep vivid canary-yellow print.

In the above example the 100 parts of the lactate of the trihydroxypolyethylether of triethanolamine may be replaced with substantially equivalent results by 50 parts of the monochloroacetate of this ether and the 260 parts of water by 310 parts of water.

Example 7

The following printing preparation is made up:
40 parts of the sodium salt of the acid sulfuric acid ester of the leuco-2:1-6:5-anthraquinonediphenylthiazole, corresponding to 50% of vat dyestuff, are dissolved by heating with 340 parts of water, 60 parts of the oxalate of the trihydroxy-polyethylether of triethanolamine (see Example 6) and 500 parts of a neutral starch tragacanth thickening. The solution is cooled down. To the cold solution there are added, whilst stirring, 40 parts of a solution of sodium nitrite (30%) and 20 parts of a solution of sodium carbonate (10%).

When cotton is printed with this preparation and the print developed, as indicated in Example 1, there is obtained an even vivid and deep canary-yellow print.

In the above example the 60 parts of the oxalate of the trihydroxy-polyethylether may be replaced with substantially equivalent results by 40 parts of the tartrate of this ether and the 340 parts of water by 360 parts of water.

Example 8

The following printing paste is made up:
40 parts of the sodium salt of the acid sulfuric acid ester of the leuco-2:1-6:5-anthraquinone-diphenylthiazol, corresponding to 50% of vat dyestuff, are dissolved by heating with 350 parts of water, 50 parts of the phthalate of triethanolamine and 500 parts of a neutral starch tragacanth thickening. The solution is cooled down and then there are added, whilst stirring, 40 parts of a sodium nitrite solution (30%) and 20 parts of a sodium carbonate solution (10%).

When cotton is printed with this preparation and the print developed, as indicated in Example 1, there is obtained an even canary-yellow print.

Example 9

The following printing preparation is made up:
40 parts of the sodium salt of the acid sulfuric acid ester of the leuco-dichloro-anthanthrone, corresponding to 50% of vat dyestuff, are dissolved by heating with 310 parts of water, 100 parts of the tartrate of the trihydroxy-polyethylether of triethanolamine (see Example 6) and 500 parts of a neutral starch tragacanth thickening. The solution is cooled down and then there are added, whilst stirring, 30 parts of a sodium nitrite solution (30%) and 20 parts of a sodium carbonate solution (10%).

When cotton is printed with this preparation and the print developed, as indicated in Example 1, there is obtained a deep, vivid orange print.

Example 10

The following printing preparation is made up:
40 parts of the sodium salt of the acid sulfuric acid ester of the leuco-2:1-6:5-anthraquinonediphenylthiazol, corresponding to 50% of vat dyestuff, are dissolved by heating with 320 parts of water, 80 parts of the dimethylaniline-para-sulfonate of the trihydroxyethylether of triethanolamine and 500 parts of a neutral starch tragacanth thickening. The solution is cooled down and then there are added, whilst stirring, 40 parts of a sodium nitrite solution (30)% and 20 parts of a sodium carbonate solution (10%).

When cotton is printed with this preparation and the print developed, as indicated in Example 1, there is obtained a deep canary-yellow print.

*Example 11*

The following printing preparation is made up:
40 parts of the sodium salt of the acid sulfuric acid ester of the leuco-2:1-6:5-anthraquinone-diphenylthiazol, corresponding to 50% of vat dyestuff, are dissolved by heating with 240 parts of water, 120 parts of the naphthalene-1-sulfonate of the trihydroxyethylether of triethanolamine and 500 parts of a neutral starch tragacanth thickening. The solution is cooled down and then there are added, whilst stirring, 40 parts of an ammonium thiocyanate solution (50%), 50 parts of a sodium chlorate solution (25%) and 10 parts of an ammonium vanadate solution (1%).

When cotton is printed with this preparation and the print developed, as indicated in Example 2, there is obtained an even and deep canary-yellow print.

*Example 12*

The following printing preparation is made up:
40 parts of the sodium salt of the acid sulfuric acid ester of the leuco-2:1-6:5-anthraquinone-diphenylthiazol, corresponding to 50% of vat dyestuff, are dissolved by heating with 300 parts of water, 100 parts of the sulforicinoleate of the trihydroxyethylether of triethanolamine and 500 parts of a neutral starch tragacanth thickening. The solution is cooled down and then there are added, whilst stirring, 40 parts of a sodium nitrite solution (30%) and 20 parts of a sodium carbonate solution (10%).

When cotton is printed with this preparation and the print developed, as indicated in Example 1, there is obtained a deep canary-yellow print.

In the above example the 100 parts of the sulforicinoleate may be replaced by 100 parts of the oleate of the trihydroxyethylether of triethanolamine.

*Example 13*

The following printing preparation is made up:
60 parts of the sodium salt of the acid sulfuric acid ester of the leuco-6:6'-diethoxy-thioindigo, corresponding to 30% of vat dyestuff are dissolved by heating with 338 parts of water, 20 parts of the phthalate of the trihydroxy-polyethylether of triethanolamine (see Example 6) and 500 parts of a neutral starch tragacanth thickening. The solution is cooled down and then there are added 40 parts of an ammonium-thiocyanate solution (50%), 32 parts of a sodium chlorate solution (25%) and 10 parts of an ammonium vanadate solution (1%). A preparation is obtained, which contains the ester salt in finest divided form.

When cotton is printed with this preparation and the print developed as indicated in Example 2, there is obtained an even, vivid and deep orange print.

*Example 14*

The following printing preparation is made up:
40 parts of the sodium salt of the acid sulfuric acid ester of the leuco-6:6'-dichloro-4:4'-dimethylthioindigo, corresponding to 50% of vat dyestuff, are dissolved by heating with 310 parts of water, 50 parts of the lactate of the trihydroxyethylether of triethanolamine and 500 parts of a neutral starch tragacanth thickening. The solution is cooled down and then there are added, whilst stirring, 80 parts of a sodium nitrite solution (30%) and 20 parts of a sodium carbonate solution (10%). The preparation thus obtained contains the ester salt precipitated in finely divided form.

When cotton is printed with this preparation and the print developed, as indicated in Example 1, there is obtained a vivid, deep rose-colored print.

*Example 15*

The following printing preparation is made up:
60 parts of the sodium salt of the acid sulfuric acid ester of the leuco-dibromo-3:4-8:9-dibenzpyrenquinone, corresponding to 30% of vat dyestuff, are dissolved by heating with 350 parts of water, 40 parts of the lactate of the trihydroxyethylether of triethanolamine and 500 parts of a neutral starch tragacanth thickening. The solution is cooled down and then there are added, whilst stirring, 30 parts of a sodium nitrite solution (30%) and 20 parts of a sodium carbonate solution (10%). The preparation thus obtained contains the ester salt precipitated in finely divided form.

When cotton is printed with this preparation and the print developed, as indicated in Example 1, there is obtained a vivid deep and even golden-yellow print.

*Example 16*

The following printing preparation is made up:
40 parts of the sodium salt of the acid sulfuric acid ester of leuco-dibromo anthanthrone, corresponding to 50% of vat dyestuff, are dissolved by heating with 360 parts of water, 80 parts of the lactate of a mixture containing hydroxyethers of the diethylaminoethanol (as obtained for instance by treating the diethylaminoethanol with 4 mol. of ethylene oxide in a methylalcoholic solution) and 500 parts of a neutral starch tragacanth thickening. The solution is cooled down and then there are added, whilst stirring, 20 parts of a sodium carbonate solution (10%). The preparation thus obtained contains the ester salt in solution.

When cotton is printed with this preparation and the print steamed for 4 minutes in a Mather-Platt apparatus and afterwards developed by treating for 2 seconds at 35° C. in a bath containing 40 ccm. of conc. sulfuric acid and 30 gr. of sodium bichromate per liter and by a subsequent air passage of 20 seconds, there is obtained, after the usual washing and soaping at the boil, an even deep orange print.

What I claim is:

1. A printing composition, comprising an ester salt of a leuco vat dyestuff, the lactate of trihydroxyethylether of triethanolamine and a thickening agent.

2. A printing composition comprising the sodium salt of the sulfuric acid ester of leuco dibromoanthanthrone, the lactate of the trihydroxyethylether of triethanolamine and a thickening agent.

3. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with an unesterified organic acid selected from the group consisting of the carboxylic acids containing not more than five carbon atoms in an open chain and the aromatic aminosulfonic acids; and a thickening agent.

4. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with an unesterified aliphatic carboxylic acid containing not more than five carbon atoms in an open chain; and a thickening agent.

5. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with an unesterified aromatic carboxylic acid; and a thickening agent.

6. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with an unesterified aromatic aminosulfonic acid; and a thickening agent.

7. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with dimethylaniline-p-sulfonic acid; and a thickening agent.

8. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with lactic acid; and a thickening agent.

9. A printing composition comprising a difficultly soluble ester salt of a leuco vat dyestuff; a salt of a primary to tertiary nitrogenous organic base, which contains at least one ether-linked oxygen atom and, as solubilizing group, at least one hydroxyalkyl group, with phthalic acid; and a thickening agent.

10. A printing composition comprising a difficultly soluble ester salt of a leuco vat dyestuff, the dimethylaniline-p-sulfonate of the trihydroxyether of triethanolamine, and a thickening agent.

11. A printing composition comprising a difficultly soluble ester salt of a leuco vat dyestuff, the phthalate of the trihydroxyether of triethanolamine, and a thickening agent.

JACQUES DUPORT.